United States Patent
Babb et al.

(10) Patent No.: US 6,359,073 B1
(45) Date of Patent: Mar. 19, 2002

(54) PROCESS OF RHEOLOGY MODIFICATION OF POLYMERS

(75) Inventors: David A. Babb; Che-I Kao; Wendy D. Hoenig; Michael E. Rowland, all of Lake Jackson, TX (US); Clark H. Cummins; H. Craig Silvis, both of Midland, MI (US); Michael J. Mullins; Thoi H. Ho, both of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/694,649

(22) Filed: Oct. 23, 2000

Related U.S. Application Data

(63) Continuation of application No. 09/133,244, filed on Aug. 13, 1998, now Pat. No. 6,143,829
(60) Provisional application No. 60/057,582, filed on Aug. 27, 1997.

(51) Int. Cl.[7] .............................. C08F 8/00; C08L 33/14
(52) U.S. Cl. ....................... 525/194; 525/197; 525/212; 525/240
(58) Field of Search ................................ 525/194, 197, 525/212, 240

(56) References Cited

U.S. PATENT DOCUMENTS

| | | |
|---|---|---|
| 3,058,944 A | 10/1962 | Breslow et al. |
| 3,203,936 A | 8/1965 | Breslow et al. |
| 3,203,937 A | 8/1965 | Breslow et al. |
| 3,282,864 A | 11/1966 | Best et al. |
| 3,298,975 A | 1/1967 | Feild et al. |
| 3,336,268 A | 8/1967 | Cox |
| 3,341,480 A | 9/1967 | Feild et al. |
| 3,389,198 A | 6/1968 | Taber |
| 3,530,108 A | 9/1970 | Oppenlander et al. |
| 4,352,892 A | 10/1982 | Lohmar |
| 4,579,905 A | 4/1986 | Krabbenhoft |
| 4,694,025 A | 9/1987 | Park |
| 4,714,716 A | 12/1987 | Park |
| 5,037,895 A | 8/1991 | Marker et al. |
| 6,143,829 A * | 11/2000 | Babb et al. .................. 525/194 |

FOREIGN PATENT DOCUMENTS

| | | |
|---|---|---|
| CA | 797917 | 10/1968 |
| CA | 1024296 | 1/1978 |
| EP | 0 702 032 A2 | 3/1996 |
| GB | 2 205 103 A | 11/1988 |
| JP | 50-133248 | 10/1975 |
| WO | 96/07681 | 3/1996 |

OTHER PUBLICATIONS

R. A. Abramovitch, "Polar Radicals in Aromatic Substitution", *Intra–Science Chemistry Reports*, pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.*, pp. 2169–2172, (1974).

R. A. Abramovitch, T. Chellathurai, W. D. Holcomb, I. T. McMaster, and D. P. Vanderpool, "Intramolecular Insertion of Arylsulfonylnitrenes into Aliphatic Side Chains[1]", *J. Org. Chem.*, vol. 42, No. 17, pp. 2920–2926, (1977).

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl– and Carbonyl–nitrenes", *J. Chem. Soc., Chem. Commun.*, pp. 1087–1088, (1981).

R. A. Abramovitch, M. Ortiz, and S. P. McManus, "Reaction of Aromatic Sulfonyl Azides with Dienes", *J. Org. Chem.*, vol. 46, pp. 330–335, (1981).

H. Radusch, J. Ding, and M. Schulz, "Chemical coupling of polystyrene and polybutadiene in melt mixtures by using an organic sulfonylazide", *Die Angewandte Makromolekulare Chemie*, vol. 204, pp. 177–189, (1993).

N. Takashima, Y. Nakayama, "The Processings of Crosslinked Plastics", *Kogaku Kogyo* (*Chemical Industry*), pp. 34(378)–39(383), (1969).

D. S. Breslow, M. F. Sloan, N. R. Newburg, and W. B. Renfrow, "Thermal Reactions of Sulfonyl Azides", *J. Amer. Chem. Soc.*, vol. 91, pp. 2273–2279, (1969).

P. Mapleston, "PP foam sheet emerges as a contender for a range of applications", *Modern Plastics*, pp. 110–111, (1997).

\* cited by examiner

*Primary Examiner*—Nathan M. Nutter

(57) ABSTRACT

The invention includes a process of reacting a poly(sulfonyl azide) with a polymer comprising steps (a) forming a first admixture of a first amount of a first polymer or in a liquid which does not require removal from the polymer and a poly(sulfonyl azide); (b) then forming a second admixture of the first admixture with a second amount of at least one second polymer; and (c) heating the second admixture at lest to the decomposition temperature of the coupling agent for a time sufficient to result in coupling of polymer chains. The invention further includes all compositions obtainable by processes of the invention as well as blends of those compositions with one or more polymers of compositions different from the first or second polymer or the product of a process of the invention. Additionally the invention includes articles made from compositions of the invention, and shaping those articles particularly by processes which comprise shaping the compositions in a melted state into an article, more preferably when the process comprises thermoforming, injection molding, extrusion, casting, blow molding, foaming or blowing as well as the use of the compositions in those processes.

7 Claims, No Drawings

PROCESS OF RHEOLOGY MODIFICATION OF POLYMERS

This application is a continuation of allowed U.S. application Ser. No. 08/133,244, filed Aug. 13, 1998, now U.S. Pat. No. 6,143,829 which claims the benefit of U.S. Provisional Application No. 60/057,582, filed Aug. 27, 1997 which is hereby incorporated by reference herein in its entirety.

This invention relates to coupling of polyolefins, more specifically coupling of polyolefins using insertion into carbon hydrogen (C—H) bonds.

As used herein, the term "rheology modification" means change in melt viscosity of a polymer as determined by dynamic mechanical spectroscopy. Preferably the melt strength increases while maintaining the high shear viscosity (that is viscosity measured at a shear of 100 rad/sec by DMS) so that a polymer exhibits more resistance to stretching during elongation of molten polymer at low shear conditions (that is viscosity measured at a shear of 0.1 rad/sec by DMS) and does not sacrifice the output at high shear conditions. An increase in melt strength is typically observed when long chain branches or similar structures are introduced into a polymer.

Polyolefins are frequently rheology modified using nonselective chemistries involving free radicals generated for instance using peroxides or high energy radiation. However, chemistries involving free radical generation at elevated temperatures also degrade the molecular weight, especially in polymers containing tertiary hydrogen such as polystyrene, polypropylene, polyethylene copolymers etc. The reaction of polypropylene with peroxides and pentaerythritol triacrylate is reported by Wang et al., in Journal of Applied Polymer Science, Vol. 61, 1395–1404 (1996). They teach that rheology modification of isotactic polypropylene can be realized by free radical grafting of di- and tri-vinyl compounds onto polypropylene. However, this approach does not work well in actual practice as the higher rate of chain scission tends to dominate the limited amount of chain coupling that takes place. This occurs because chain scission is an intra-molecular process following first order kinetics, while coupling is an inter-molecular process with kinetics that are minimally second order. Chain scission results in lower molecular weight and higher melt flow rate than would be observed were the branching not accompanied by scission. Because scission is not uniform, molecular weight distribution increases as lower molecular weight polymer chains referred to in the art as "tails" are formed.

The teachings of U.S. Pat. Nos. 3,058,944; 3,336,268; and 3,530,108 include the reaction of certain poly(sulfonyl azide) compounds with isotactic polypropylene or other polyolefins by nitrene insertion into C—H bonds. The product reported in U.S. Pat. No. 3,058,944 is crosslinked. The product reported in U.S. Pat. No. 3,530,108 is foamed and cured with cycloalkane-di(sulfonyl azide) of a given formula. In U.S. Pat. No. 3,336,268 the resulting reaction products are referred to as "bridged polymers" because polymer chains are "bridged" with sulfonamide bridges. The disclosed process includes a mixing step such as milling or mixing of the sulfonylazide and polymer in solution or dispersion then a heating step where the temperature is sufficient to decompose the sulfonylazide (100° C. to 225° depending on the azide decomposition temperature). The starting polypropylene polymer for the claimed process has a molecular weight of at least about 275,000. Blends taught in U.S. Pat. No. 3,336,268 have up to about 25 percent ethylene propylene elastomer.

U.S. Pat. No. 3,631,182 taught the use of azido formate for crosslinking polyolefins. U.S. Pat. No. 3,341,418 taught the use of sulfonyl azide and azidoformate compounds to crosslink of thermoplastics material(PP (polypropylene), PS (polystyrene),PVC (poly(vinyl chloride)) and their blends with rubbers(polyisobutene, EPM, etc.).

Similarly, the teachings of Canadian patent 797,917 (family member of NL 6,503,188) include rheology modification using from about 0.001 to 0.075 weight percent polysulfonyl azide to modify homopolymer polyethylene and its blend with polyisobutylene.

Teachings of incorporating poly (sulfonyl azides) into polymers in these references are typically directed to mixing poly(sulfonyl azide) as a solid or in a solvent into a polymer. Disadvantageously, mixing solids often results in localized concentrations of azide which evidence themselves as gels, discoloration, for instance black specks, or uneven amounts of coupling. Using a solvent, however, requires an extra step of removing solvent and sometimes equipment adaptations for the removal and handling volatile chemicals.

It would be desirable to avoid dark specks, gels and other evidence of localized poly(sulfonyl azide) and to avoid removing or handling solvent yet to obtain polymers rheology modified rather than crosslinked (that is having less than about 10 percent gel as determined by xylene extraction specifically by ASTM 2765). Which polymers, in the case of high density polyethylene are desirably of narrow molecular weight distribution (MWD) (that is having most preferably less than about 3.0 Mw/Mn, and preferably density greater than 0.945 g/ml) advantageously made using single site, single site metallocene or single site constrained geometry catalysts (hereinafter HDPE of narrow MWD) which polymers advantageously have a combination of good processability as indicated by higher melt strength at a constant low shear viscosity e.g. 0.1 rad/sec measured by DMS, and higher toughness, tensile and/or elongation than a high density polyethylene of broader molecular weight distribution treated with sulfonyl azides according to the practice of the prior art using the same equivalents (stoichiometry) of coupling reactant to polymer higher toughness than that of the same starting material coupled or rheology modified using the same equivalents of a free radical coupling agent. Desirably, the product would have better organoleptics than coupled broader MWD HDPE. Advantageously, compositions would have less undesirable odor than the same starting materials coupled or rheology modified using the same chemical equivalents of free radical generating agents. Preferably, a process of the invention would result in more consistent coupling than methods of coupling involving free radicals, that is use of the same reactants, amounts and conditions would result in consistent amounts of coupling or consistent (reproducible) property changes, especially consistent amounts of gel formation. Preferably, a process would be less subject to effects from the presence of oxygen than would a coupling or rheology modification involving agents which generate free radicals.

In the case of, medium and lower density polyethylene (that is polymers having a density of from about 0.94 g/cc to about 0.90 g/cc), which are advantageously copolymers of ethylene in which the percent comonomer is preferably about 0.5 to 5 mole percent comonomer based on total polymer as determined by ASTM 5017, the polymers would desirably show a combination of processability improved over the starting material with retention of toughness, low heat seal initiation temperature, low haze, high gloss or hot tack properties characteristic of the starting material.

In the case of elastomeric polymers containing ethylene repeating units in which the preferred comonomer content is about 5–25 mole percent, and preferably a density less than about 0.89 g/mL, it would be desirable to have a better mechanical properties such as elongation and tensile strength than would be achieved in the starting material or by coupling using the same chemical equivalents of free radical generating agent like a peroxide.

SUMMARY OF THE INVENTION

Polymers coupled by reaction with coupling agents according to the practice of the invention advantageously have at least one of these desirable properties and preferably have desirable combinations of these properties.

The invention includes a process of reacting a poly (sulfonyl azide) with a polymer comprising steps (a) forming a first admixture, hereinafter referred to as a concentrate, of a first amount of a first polymer or in a liquid which does not require removal from the polymer, hereinafter diluent, and a poly(sulfonyl azide); (b) then forming a second admixture of the first admixture with a second amount of at least one second polymer, hereinafter second polymer composition; and (c) heating the second admixture at least to the decomposition temperature of the coupling agent for a time sufficient to result in coupling of polymer chains. The diluent is preferably a non-volatile, non-polar compound such as mineral oil in which the poly(sulfonyl azide) is sufficiently miscible to disperse the poly(sulfonyl azide) in the second polymer, more preferably a liquid at room temperature or low melting solid at room temperature, that is has a melting point below about 50° C. When a first polymer is used, it is preferably low melting, that is has a melting point below about 150° C., more preferably 110° C., or a melt index, I2, of at least about 0.5 g/10 min. and most preferably is selected from ethylene alpha olefin copolymers, where the alpha olefins are of 3 to 20 carbon atoms, have a density range of at least about 0.855 g/cc to about 0.955 g/cc or have a melt index, I2, of at least about 0.5 g/10 min; ethylene acrylic acid; ethylene vinyl acetate, ethylene/styrene interpolymers or combinations thereof. The concentrate is optionally formed on the surface of a polymer to be coupled. Step (b) preferably takes place in melt processing equipment; more preferably steps (a) and (b) take place in the same vessel, which is preferably in the post-reactor area of a polymer processing plant.

The invention further includes all compositions obtainable by processes of the invention as well as blends of those compositions with one or more polymers of compositions different from the first or second polymer or the product of a process of the invention. Additionally the invention includes articles made from compositions of the invention, and shaping those articles particularly by processes which comprise shaping the compositions in a melted state into an article, more preferably when the process comprises thermoforming, injection molding, extrusion, casting, blow molding, foaming or blowing as well as the use of the compositions in those processes.

DETAILED DESCRIPTION OF THE INVENTION

Practice of the invention is applicable to any thermoplastic polymer which has at least one C—H bond that can react with azide including homopolymers and copolymers with narrow and broad (including bimodal) comonomer distribution (narrow and broad, including bimodal, molecular weight distribution) such as copolymers of ethylene with one or more alpha olefin (C3 to C20), ethylene copolymers with unsaturation (EPDM or EODM, that is ethylene-propylene-diene or ethylene-octene-diene), or other polymers such as linear high density polyethylene, LDPE (low density polyethylene), ethylene vinyl acetate copolymers, ethylene acrylic acid copolymers, styrene based block copolymers (SBS, SEBS, SIS and the like, that is styrene/butadiene/styrene, styrene/ethylene/butylene/styrene (hydrogenated SEBS), styrene/isoprene/styrene and the like), substantially random interpolymers of at least one alpha-olefin with at least one vinyl aromatic or hindered vinyl aliphatic comonomer including ethylene-styrene interpolymers, syndiotatic polystyrene, atactic polystyrene, hydrogenated polyvinyl cyclohexene, PET (poly(ethylene terephthalate)), PBT (polybutylene terephthalate), PEN (polyethylene naphthalate), polylactic acid, thermoplastic polyurethanes, polycarbonate, nylon, poly(methyl methacrylates), ABS (acrylonitrile/butylene/styrene), polysulfone, polyphenylene oxide, polyphenylene sulfides, polyacetal and polyvinyl chloride.

Preferred polymers for use in the practice of the invention are polymers prepared from ethylene, advantageously ethylene in combination with other monomers polymerizable therewith. Such monomers include alpha olefins and other monomers having at least one double bond.

Alpha olefins having more than 2 carbon atoms include propylene, 1-butene, 1-pentene, 1-hexene, 1-octene, 1-nonene, 1-decene, 1-unidecene, 1-dodecene and the like as well as 4-methyl-1-pentene, 4-methyl-1-hexene, 5-methyl-1-hexene, vinylcyclohexene, styrene and the like.

Interpolymers useful in the practice of the invention optionally and in one preferred embodiment include monomers having at least two double bonds which are preferably dienes or trienes. Suitable diene and triene comonomers include 7-methyl-1,6-octadiene, 3,7-dimethyl-1,6-octadiene, 5,7-dimethyl-1,6-octadiene, 3,7,11-trimethyl-1,6, 10-octatriene, 6-methyl-1,5-heptadiene, 1,3-butadiene, 1,6-heptadiene, 1,7-octadiene, 1,8-nonadiene, 1,9-decadiene, 1,10-undecadiene, bicyclo[2.2.1]hepta-2-5-diene (norbornadiene), tetracyclododecene, or mixtures thereof, preferably butadiene, hexadienes, and octadienes, most preferably 1,4-hexadiene, 4-methyl-1,4-hexadiene, 5-methyl-1, 4-hexadiene, dicyclopentadiene, bicyclo[2.2.1]hepta-2-5-diene (norbornadiene) and 5-ethylidene-2-norbornene.

Polymers useful in the practice of the invention also optionally include repeating units formed from monomers having functional groups such as carboxylic acid and esters, alcohol, or amine groups, halogen (advantageously chlorine, bromine, or fluorine, preferably chlorine or fluorine). Such monomers include acrylic acid, methacrylic acid, vinyl chloride, vinylidene chloride, vinyl acetate, alkyl esters, particularly ethyl, methyl, or butyl acrylate or methacrylate. or carbon monoxide Polyolefins are formed by means within the skill in the art. The alpha olefin monomers and optionally other addition polymerizable monomers are polymerized under conditions within the skill in the art, Such conditions include those utilized in processes involving Ziegler-Natta catalysts such as those disclosed in U.S. Pat. No. 4,076,698 (Anderson et al); U.S. Pat. No. 4,950,541 and the patents to which they refer, as well as U.S. Pat. No. 3,645,992 (Elston) as well as those processes utilizing metallocene and other single site catalysts such as exemplified by U.S. Pat. No. 4,937,299 (Ewen et al.), U.S. Pat. No. 5,218,071 (Tsutsui et al.), U.S. Pat. Nos. 5,278,272, 5,324,800, 5,084,534, 5,405,922, 4,588,794, 5,204,419 and the processes subsequently discussed in more detail.

In one embodiment, starting material polyolefins are preferably substantially linear ethylene polymers (SLEPs).

The substantially linear ethylene polymers (SLEPs) are homogeneous polymers having long chain branching. They are disclosed in U.S. Pat. Nos. 5,272,236 and 5,278,272, the disclosures of which are incorporated herein by reference. SLEPs are available as polymers made by the Insite™ Process and Catalyst Technology such as Engage™ polyolefin elastomers (POEs) commercially available from DuPont Dow Elastomers LLC and Affinity™ polyolefin plastomers (POPs) commercially available from The Dow Chemical Company. Specific examples of useful Engage™ POEs include SM 8400, EG 8100, and CL 8001 and specific examples of useful Affinity™ POPs include FM-1570, HM 1100, and SM 1300, each of which is commercially available from The Dow Chemical Company. SLEPs can be prepared via the solution, slurry, or gas phase, preferably solution phase, polymerization of ethylene and one or more optional α-olefin comonomers in the presence of a constrained geometry catalyst, such as is disclosed in European Patent Application 416,815-A, incorporated herein by reference.

The substantially linear ethylene/α-olefin polymers are made by a continuous process using suitable constrained geometry catalysts, preferably constrained geometry catalysts as disclosed in U.S. application Ser. No.: 545,403, filed Jul. 3, 1990; Ser. No. 758,654, filed Sep. 12, 1991; Ser. No. 758,660, filed Sep. 12, 1991; and Ser. No. 720,041, filed Jun. 24, 1991, the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

The expression "continuous process" means a process in which reactants are continuously added and product is continuously withdrawn such that an approximation of a steady state (i.e. substantially constant concentration of reactants and product while carrying out the process) is achieved. The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers to be Theologically modified according to the present invention, such as those disclosed in U.S. Pat. No. 3,914,342, incorporated herein by reference. The multiple reactors can be operated in series or in parallel, with at least one constrained geometry catalyst employed in one of the reactors.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

In contrast to the term "substantially linear", the term "linear" means that the polymer lacks measurable or demonstrable long chain branches, i.e., the polymer is substituted with an average of less than 0.01 long chain branch/1000 carbons.

For ethylene/α-olefin interpolymers, "long chain branching" (LCB) means a chain length longer than the short chain branch that results from the incorporation of the α-olefin(s) into the polymer backbone. Each long chain branch has the same comonomer distribution as the polymer backbone and can be as long as the polymer backbone to which it is attached.

The empirical effect of the presence of long chain branching in the substantial linear ethylene/α-olefin interpolymers used in the invention is manifested in its enhanced Theological properties which are quantified and expressed herein in terms of gas extrusion rheometry (GER) results and/or melt flow, $I_{10}/I_2$, increases.

The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C.29, V. 2&3, p. 285–297), the disclosure of which is incorporated herein by reference.

As a practical matter, current $^{13}C$ nuclear magnetic resonance spectroscopy cannot distinguish the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J.Chem. Phys., 17,1301 (1949) and Rudin, A., *Modern Methods of Polymer Characterization,* John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous substantially linear homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$) as a function of Log ($M_w$) as determined by GPC illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

SLEPs are further characterized as having:
(a) a melt flow ratio, $I_{10}/I_2 \geq 5.63$,
(b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, the linear ethylene polymer has an $I_2$, $M_w/M_n$ and, preferably density, which are each within ten percent of the SLEP and wherein the respective critical shear rates of the SLEP and the linear ethylene polymer are measured at the same melt temperature using a gas extrusion rheometer, and, preferably,
(d) a single differential scanning calorimetry, DSC, melting peak between −30 and 150° C.

For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25.

The melt index for the substantially linear olefin polymers useful herein is preferably at least about 0.1 grams/10 minutes (g/10 min), more preferably at least about 0.5 g/10 min and especially at least about 1 g/10 min up to preferably about 100 g/10 min, more preferably up to about 50 g/10 min, and especially up to about 20 g/10 min.

Determination of the critical shear rate and critical shear stress in regards to melt fracture as well as other rheology properties such as Theological processing index (PI), is performed using a gas extrusion rheometer (GER). The gas extrusion rheometer is described by M. Shida, R. N. Shroff and L. V. Cancio in *Polymer Engineering Science,* Vol. 17, No. 11, p. 770 (1977), and in *Rheometers for Molten Plastics* by John Dealy, published by Van Nostrand Reinhold Co. (1982) on pp. 97–99, both of which are incorporated by reference herein in their entirety. GER experiments are generally performed at a temperature of 190° C., at nitrogen pressures between 250 to 5500 psig using a 0.0754 mm diameter, 20:1 L/D die with an entrance angle of 180°. For the SLEPs described herein, the PI is the apparent viscosity (in kpoise) of a material measured by GER at an apparent shear stress of $2.15 \times 10^6$ dyne/cm$^2$. The SLEPs for use in the invention includes ethylene interpolymers and have a PI in the range of 0.01 kpoise to 50 kpoise, preferably 15 kpoise or less. The SLEPs used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the SLEPs.

The Theological behavior of SLEPs can also be characterized by the Dow Rheology Index (DRI), which expresses a polymer's "normalized relaxation time as the result of long chain branching." (See, S. Lai and G. W. Knight *ANTEC '93 Proceedings,* INSITE™ Technology Polyolefins (SLEP)— New Rules in the Structure/Rheology Relationship of Ethylene α-Oefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the SLEPs useful in this invention, DRI is preferably at least 0.1, and especially at least 0.5, and most especially at least 0.8. DRI can be calculated from the equation:

$$DRI = (3652879 * \tau_o^{1.00649}/\eta_o - 1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e., $$\eta/\eta_o = 1/(1 + (\gamma \cdot \tau_o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 190° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190° C. Specific material determinations can be performed from 140 to 190° C. as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is defined as the loss of extrudate gloss. The loss of extrudate gloss is the point at which the surface roughness of the extrudate can only be detected by a 40X magnification. The critical shear rate at the onset of surface melt fracture for the SLEPs is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the SLEPs, especially those having a density >0.910 g/cc, used in the invention is greater than $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

The SLEPs used in the invention are also characterized by a single DSC melting peak. The single melting peak is determined using a differential scanning calorimeter standardized with indium and deionized water. The method involves 3–7 mg sample sizes, a "first heat" to about 180° C. which is held for 4 minutes, a cool down at 10° C./min. to −30° C. which is held for 3 minutes, and heat up at 10° C./min. to 140° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

The molecular weight distributions of ethylene α-olefin polymers are determined by gel permeation chromatography (GPC) on a Waters 150° C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å ($10^{-4}$, $10^{-3}$, $10^{-2}$ and $10^{-1}$ mm). The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science,* Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating $M_w$ and j=−1 when calculating $M_n$.

The density of the linear or the substantially linear ethylene polymers (as measured in accordance with ASTM D-792) for use in the present invention is generally less than about 0.95 g/cm$^3$. The density is preferably at least about 0.85 g/cm$^3$ and especially at least about 0.86 g/cm$^3$ and preferably up to about 0.94 g/cm$^3$, more preferably up to about 0.92 g/cm$^3$. When the modified resins are to be used for extrusion and injection molding, the density of the polymer is preferably at least 0.855 g/cm$^3$, more preferably at least 0.865 g/cm$^3$, and even more preferably at least 0.870 g/cm$^3$, up to preferably 0.900 g/cm$^3$, more preferably 0.885 g/cm$^3$, and even more preferably up to 0.880 g/cm$^3$. The most preferred density is determined primarily by the modulus of elasticity or flexibility desired in the molded article. The density remains substantially constant during rheology modification according to this invention.

The ethylene polymers which may be rheology modified according to this invention may be any interpolymers of ethylene and at least one α-olefin. Suitable α-olefins are represented by the following formula:

$$CH_2=CHR$$

in which R is a hydrocarbyl radical. R generally has from one to twenty carbon atoms. Suitable α-olefins for use as comonomers in a solution, gas phase or slurry polymerization process or combinations thereof include 1-propylene, 1-butene, 1-isobutylene, 1-pentere, 1-hexene, 4-methyl-1-pentene, 1-heptene and 1-octene, as well as other monomer types such as tetrafluoroethylene, vinyl benzocyclobutane, and cycloalkenes, e.g. cyclopentene, cyclohexene, cyclooctene, and norbornene (NB). Preferably, the α-olefin will be 1-butene, 1-pentene, 4-methyl-1-pentene, 1-hexene, 1-heptene, 1-octene, or NB, or mixtures thereof. More preferably, the α-olefin will be 1-hexene, 1-heptene, 1-octene, or mixtures thereof. Most preferably, the α-olefin will be 1-octene. The ethylene polymer rheology modified according to this invention is preferably a SLEP.

These interpolymers preferably contain at least about 2 weight percent, more preferably at least about 5 weight percent, α-olefin.

The polyolefin is a homopolymer, copolymer, or interpolymer. Preferably the homo or copolymers contain ethylene repeating units. In polyethylene copolymers, the comonomer content is greater than about 1 weight percent as determined by $^{13}$C NMR (carbon 13 nuclear magnetic resonance) and more preferably greater than about 3 weight percent of any monomer copolymerizable with ethylene, preferably an alpha olefin or cyclic olefin, more preferably such an olefin of less than about 20 carbon atoms, most preferably from about 2 to about 18 carbon atoms. The comonomer content is at least one comonomer polymerizable with ethylene, preferably less than about 4 comonomers polymerizable with ethylene, more preferably less than 2 such comonomers.

Optionally, however, the practice of this invention includes other hydrocarbon polymers such as polystyrene, poly(stryene-coacrylonitrile), polyvinylcyclohexene, polybutadiene, polyisoprene, cyclic olefin copolymers and copolymers, and the like, and mixtures thereof. Polymers having at least about 3 weight percent styrene or substituted styrene units are referred to herein as styrenic polymers.

In one embodiment, preferred polymers for starting materials useful in the practice of this invention are slurry high density polyethylene homopolymers preferably made using single site catalysis with a narrow MWD (preferably less than about 3.0 Mw/Mn, more preferably MWD less than about 2.5, most preferably with a density greater than about 0.945 g/ml). Preferred melt index of the starting material depends on the desired application; however, the preferred melt index for injection molding is from about 0.5 to about 50 g/10 min; for film and thermotorming applications the preferred melt index is from about 0.1 to about 20 g/10 min; and for blow molding applications, the preferred melt index is from about 0.01 to about 20 g/10 min. These polymers have a good balance of mechanical properties and processability.

The most preferred polymers as starting materials for this invention are ethylene copolymers with narrow MWD (that is a Mw/Mn of less than 3.0 most preferably less than about 2.5). These can be produced using at least one C3–C20 olefin comonomer. Most preferred for copolymer is C3–C10. About 0.5–5 mole percent comonomer as determined by ASTM 5017 is preferred in the starting material. The preferred melt index of the starting material depends on applications; however, the preferred melt index for injection molding is from about 0.5 to about 50 g/10 min, for thermoforming applications the preferred melt index is from about 0.1 to about 20 g/10 min, and for blow molding applications, the preferred melt index is from about 0.01 to about 20 g/10 min measured. Commercially available polymers in this category are known as TAFMER polymer commercially available from Mitsui Petrochemical Industries, EXACT polymer commercially available from Exxon Chemical Company, AFFINITY polyolefin plastomer commercially available from The Dow Chemical Company, ENGAGE polyolefin elastomer commercially available from DuPont-Dow Elastomers, and the like. For thermoplastic applications such as film and injection molding, the most preferred comonomer content is between about 3–25 weight percent. For elastomeric applications, the preferred comonomer content is between about 20–40 weight percent. The most preferred terpolymer is an EPDM such as NORDEL ethylene/propylene/diene polymer commercially available from DuPont-Dow Elastomers.

The melt index is measured according to ASTM D-1238 condition 190° C./2.16 Kg(formerly known as Condition E).

In one preferred embodiment the polymer includes at least one ethylene/styrene interpolymer. The interpolymers employed in the present invention include, but are not limited to, substantially random interpolymers prepared by polymerizing one or more α-olefin monomers with one or more vinyl aromatic monomers and/or one or more hindered aliphatic or cycloaliphatic vinyl monomers, and optionally with other polymerizable ethylenically unsaturated monomer(s).

Suitable α-olefin monomers include for example, α-olefin monomers containing from 2 to about 20, preferably from 2 to about 12, more preferably from 2 to about 8 carbon atoms. Preferred such monomers include ethylene, propylene, butene-1, 4-methyl-1-pentene, hexene-1 and octene-1. Most preferred are ethylene or a combination of ethylene with C2–8 α-olefins. These α-olefins do not contain an aromatic moiety.

Suitable vinyl aromatic monomers which can be employed to prepare the interpolymers employed include, for example, those represented by the following formula:

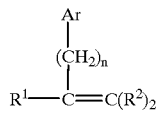

wherein R1 is selected from the group of radicals consisting of hydrogen and alkyl radicals containing from 1 to about 4 carbon atoms, preferably hydrogen or methyl; each R2 is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, C1-4-alkyl, and C1-4-haloalkyl; and n has a value from zero to about 6, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl-(C1–C4) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

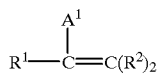

wherein Al is a sterically bulky, aliphatic or cycloaliphatic substituent of up to 20 carbons, R1 is selected from the group of radicals consisting of hydrogen and alkyl radicals containing from 1 to about 4 carbon atoms, preferably hydrogen or methyl; each R2 is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred aliphatic or cycloaliphatic vinyl or vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

Other optional polymerizable ethylenically unsaturated monomer(s) include strained ring olefins such as norbornene and C1–10 alkyl or C6–10 aryl substituted norbornenes, with an exemplary interpolymer being ethylene/styrene/norbornene.

The number average molecular weight (Mn) of the polymers and interpolymers is usually greater than about 5,000, preferably from about 20,000 to about 1,000,000, more preferably from about 50,000 to about 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl aromatic homopolymer may be formed due to homopolymerization of the vinyl aromatic monomer at elevated temperatures. The presence of vinyl aromatic homopolymer, in general, is not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 20 weight percent, preferably less than 15 weight percent based on the total weight of the interpolymers of vinyl aromatic homopolymer is present.

The substantially random interpolymers are prepared by polymerizing a mixture of polymerizable monomers in the presence of metallocene or constrained geometry catalysts in the presence of various cocatalysts as described in EP-A-0,416,815 by James C. Stevens et al. and U.S. Pat. No. 5,703,187 by Francis J. Timmers which are incorporated herein by reference in their entireties. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in U.S. application Ser. No. 07/702,475 filed May 20, 1991 corresponding to EP-A-514,828; U.S. application Ser. No. 07/876,268, (C-39819-A) filed May 1, 1992 corresponding to EP-A-520,732; U.S. application Ser. No. 08/241,523, (C-41350-B) filed May 12, 1994; U.S. application Ser. No. 60/034,819(C-42890), filed Dec. 19, 1996; as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,703,187; 5,556,928 and 5,721,185 all of which patents and applications are incorporated herein by reference in their entireties.

Another, alternative, preferred embodiment involves the use of polyolefin-carbon monoxide (CO) copalymers such as ethylene-carbon monoxide copolymers, propylene-carbon monoxide, and ethylene-propylene-carbon monoxide. Such polymers are commercially available from The Dow Chemical Company (generally CO content less than about 2 weight percent) and Shell Oil Company (generally higher amounts of CO). Alternatively, they are prepared by means within the skill in the art such as that disclosed U.S. Pat. Nos. 3,835,123; 3,984,388; 4,970294; 5,554,777 and 5,565,547; which are incorporated herein by reference in their entireties.

For the purposes of rheology modification or coupling, the polymer is reacted with a polyfunctional compound capable of insertion reactions into C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; *Tetrahedron*, (1985), 41(8), pages 1509–1516, and nitrenes as generated from azides, as cited in Abramovitch, R. A.,; Chellathurai, T.; Holcomb, W. D; McMaster, I. T.; and Vanderpool, D. P.; *J. Org. Chem.*, (1977), 42(17), 2920–6, and Abramovitch, R. A., Knaus, G. N., *J. Org. Chem.*, (1975), 40(7), 883–9.

Compounds having at least two functional groups capable of C—H insertion under reaction conditions are referred to herein as coupling agents. Such coupling agents include alkyl and aryl azides (R—$N_3$), acyl azides (R—C(O)$N_3$), azidoformates (R—O—C(O)—$N_3$), phosphoryl azides ((RO)$_2$—(PO)—$N_3$), phosphinic azides ($R_2$—P(O)—$N_3$) and silyl azides ($R_3$—Si—$N_3$).

Polyfunctional compounds capable of insertions into C—H bonds also include poly(sulfonyl azide)s. The poly (sulfonyl azide) is any compound having at least two sulfonyl azide groups (—$SO_2N_3$) reactive with the polyolefin. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonlazide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides (R—$N_3$), acyl azides (R—C(O)$N_3$), azidoformates (R—O—C(O)—$N_3$), sulfonyl azides (R—$SO_2$—$N_3$), phosphoryl azides ((RO)$_2$—(PO)—$N_3$), phosphinic azides ($R_2$—P(O)—$N_3$)and silyl azides ($R_3$—Si—$N_3$). Some of the coupling agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred coupling agents is conveniently possible because of the differences in the temperatures at which the different classes of coupling agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the coupling agent adequately dispersed and located substantially in the desired position in the final product. Such location and dispersion may be different from product to product depending on the desired properties of the final product.) Phosphoryl azides may be reacted at temperatures in excess of 180° C. up to about 300° C., while silyl azides react preferentially at temperatures of from about 250° C. to 400° C.

To modify rheology, also referred to herein as "to couple," the poly(sulfonyl azide) is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in at least about 10 weight percent gel as measured by ASTM D2765-procedure A. While those skilled in the art will recognize that the amount of azide sufficient to increase the low shear viscosity and result in less than about 10 weight percent gel will depend on molecular weight of the azide used and polymer the amount is preferably less than about 5 percent, more preferably less than about 2 percent, most preferably less than about 1 weight percent poly(sulfonyl azide) based on total weight of polymer when the poly(sulfonyl azide) has a molecular weight of from about 200 to about 2000. To achieve measurable rheology modification, the amount of poly(sulfonyl azide) is preferably at least about 0.01 weight percent, more preferably at least about 0.05 weight percent, most preferably at least about 0.10 weight percent based on total polymer.

For rheology modification, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide)begins to react at a kinetically significant rate (convenient for use in the practice of the invention) at temperatures of about 130° C. and is almost completely reacted at about 160° C. in a DSC (scanning at 10° C./min). ARC (scanning at 2° C./ hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the coupling agent with the polymer(s) without undesirable thermal degradation of the polymer natrix. Preferred reaction times in terms of the half life of the coupling agent, that is the time required for about half of the agent to be reacted at a preselected temperature, which half life is. determinable by DSC is about 5 half lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what rheological properties are to be modified. In a homopolymer it is desirable to have as homogeneous a distribution as possible, preferably achieving solubility of the azide in the polymer melt. In a blend it is desirable to have low solubility in one or more of the polymer matrices such that the azide is oreferentially in one or the ocher phase, or predominantly in the interfacial region between the two phases.

It has been found that the process of combining the polymer and coupling agent are important to achieving the desired result of avoiding localized gels, dark specks or other indications of non-uniform distribution of coupling agent and, especially, of avoiding the disadvantages of solvent handling and removal inherent in use of solvents for the coupling agent. After practice of the present invention there are preferably less than about 10 percent, more preferably less than about 5 percent, most preferably less than about 2 weight percent gels present as determined by xylene solubility.

Preferred processes include at least one of (a) introducing, e.g. by injection, a coupling agent in liquid form, in a slurry or other admixture of coupling agent in a liquid which does not require removal from the polymer, hereinafter diluent, into a device containing polymer, preferably softened, molten or melted polymer, but alternatively in particulate form, more preferably in melt processing equipment; or (b) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)). Hereinafter, in both methods the admixture containing coupling agent (with either the diluent or the first polymer or a combination thereof) is referred to as a "concentrate." Of the two steps (b) is preferred. For example, process (b) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art.

In (a), the diluent is a compound which does not require removal from the resulting polymer composition, that is a compound which does not interfere undesirably with subsequent process steps applied to the resulting polymer composition. By does not interfere undesirably, is meant that while those skilled in the art may recognize a slight effect from its presence, e.g. a slower subsequent step, that effect is not so disadvantageous as to dissuade one from using the diluent. To that end the diluent differs from a solvent in being non-volatile (no more than 5 percent vapor pressure) at temperatures encountered in subsequent process steps, including decomposition of the coupling agent (that is up to about 260° C.) such that increased pressure or other means is not required for its control in subsequent steps. The diluent is preferably a liquid at room temperature or low melting (that is melting point below about 50° C.) solid at room temperature. Diluents are preferably non-polar compounds such as mineral oils in which the coupling agent is sufficiently miscible to disperse the coupling agent in a polymer. Such diluents include mineral oil; aliphatic carboxylic acid esters preferably of at least about 12 carbon atoms, more preferably of less than about 200 carbon atoms; parafinic, naphthenic, or aromatic oil having a boiling point greater than about 230° C., but preferably liquid at 20° C., preferably mineral oil. In (b), the first polymer is preferably low melting, that is has a melting point below about 110° C. or a melt index (I2) of at least about 0.25 g/10 min., preferably 1 g/10 min or greater. Such polymers include, for instance, ethylene alpha olefin copolymers, especially where the alpha olefins are of 3 to 20 carbons, have a density range of at least about 0.855 g/cc, preferably up to about 0.955 g/cc, more preferably up to about 0.890 g/cc, preferably with an melt index (I2) of at least about 0.5 g/10 min, more preferably at least about 5, and preferably less than about 2000 g/10 min, more preferably less than about 1000 g/10 min., most preferably less than about 100 g/10 min. Similarly, ethylene acrylic acid, ethylene vinyl acetate and ethylene/styrene interpolymers preferably with a melting temperature of less than about 150° C., more preferably less than about 130° C.

The concentrate is conveniently blended with polymer in any form, for instance molten, powdered, pelleted and the like, preferably dry blended with pelleted polymer or injection of molten concentrate into molten polymer, advantageously molten polymer directly from or in a polymerization reactor.

Optionally, the concentrate is formed on the surface of a polymer to be coupled according to the practice of the invention. For instance, a diluent is coated on a polymer, conveniently a comminuted polymer, preferably pelleted or powdered, more preferably pelleted, for instance by stirring or tumbling particulate polymer with a diluent, for instance, mineral oil. Then the coupling agent is admixed with the diluent coated on the polymer. Thus, steps of the process of the invention suitably occur in any order that results in a sufficiently uniform admixture of concentrate and polymer (s) to substantially avoid evidence of localized concentrations of coupling agent.

The term "melt processing" is used to mean any process in which the polymer is softened or melted, such as extrusion, pelletizing, molding, thermoforming, film blowing, compounding in polymer melt form, fiber spinning, and the like.

Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention either higher at low angular frequency (e.g. 0.1 rad/sec) or lower at higher angular frequency (e.g. 100 rad/sec) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeniety rather than localized concentrations at the surface.

Any equipment is suitably used, preferably equipment which provides sufficient mixing and temperature control in the same equipment, but advantageously practice of the invention takes place in such devices as an extruder or a static polymer mixing device such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step.

In a preferred embodiment the process of the present invention takes place in a single vessel, that is mixing of the coupling agent and polymer takes place in the same vessel as heating to the decomposition temperature of the coupling agent. The vessel is preferably a twin-screw extruder, but is also advantageously a single-screw extruder or a batch mixer. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture.

To avoid the extra step and resultant cost of re-extrusion and to ensure that the coupling agent is well blended into the polymer, in alternative preferred embodiments it is preferred that the coupling agent be added to the post-reactor area of a polymer processing plant. For example, in a slurry process of producing polyethylene, the coupling agent is added in either powder or liquid form to the powdered polyethylene after the solvent is removed by decantation and prior to the drying and densification extrusion process. In an alternative embodiment, when polymers are prepared, in a gas phase process, the coupling agent is preferably added in either powder or liquid form to the powdered polyethylene before the densification extrusion. In an alternative embodiment when a polymer is made in a solution process, the coupling agent is preferably added to the polymer solution or to a devolatilized polymer melt prior to the densification extrusion process.

Practice of the process of the invention to rheology modify polymers yields rheology modified or chain coupled polymers, that is the polymers which have sulfonamide, amine, alkyl-substituted or aryl-substituted carboxamide, alkyl-substituted or aryl-substituted phosphoramide, alkyl-substituted or aryl-substituted methylene coupling between different polymer chains. Resulting compounds advantageously show higher low shear viscosity than the original polymer due to coupling of long polymer chains to polymer backbones. Broad molecular weight distribution polymers (polydispersity (P.D.) of 3.5 and greater) and gel levels less than 10 percent as determined by xylene extraction show less improvement than the dramatic effect noted in narrow MWD polymer (P.D.=2.0) with gel less than 10 percent as determined by xylene extraction.

Rheology modification leads to polymers which have controlled Theological properties, specifically improved melt strength as evidenced by increased low shear viscosity, better ability to hold oil, improved scratch and mar resistance, improved tackiness, improved green strength (melt), higher orientation in high shear and high extensional processes such as injection molding, film extrusion (blown and cast), calendaring, rotomolding, fiber production, profile extrusion, foams, and wire & cable insulation as measured by tan delta as described hereinafter elasticity by viscosity at 0.1 rad/sec and 100 rad/sec, respectively. It is also believed that this process can be used to produce dispersions having improved properties of higher low shear viscosity than the unmodified polymer as measured by DMS.

Rheology modified polymers are useful as large blow molded articles due to the higher low shear viscosity than unmodified polymer and the maintenance of the high shear viscosity for processability as indicated by high shear viscosity, foams for stable cell structure as measured by low shear viscosity, blown film for better bubble stability as measured by low shear viscosity, fibers for better spinnability as measured by high shear viscosity, cable and wire insulation for green strength to avoid sagging or deformation of the polymer on the wire as measured by low shear viscosity which are aspects of the invention.

Polymers rheology modified according to the practice of the invention are superior to the corresponding unmodified polymer starting materials for these applications due to the elevation of viscosity, of preferably at least about 5 percent at low shear rates (0.1 rad/sec), sufficiently high melt strengths to avoid deformation during thermal processing (e.g. to avoid sag during thermoforming) or to achieve bubble strength during blow molding, and sufficiently low high shear rate viscosities to facilitate molding and extrusion. These Theological attributes enable faster filling of injection molds at high rates than the unmodified starting materials, the setup of foams (stable cell structure)as indicated by formation of lower density closed cell foam, preferably with higher tensile strength, insulation properties, and/or compression set than attained in the use of coupling or rheology modification using coupling agents which generate free radicals, because of high melt viscosity. Advantageously toughness and tensile strength of the starting material is maintained.

Polymers resulting from the practice of the invention are different from those resulting from practice of prior art processes as shown in CA 797,917. The polymers of the present invention show improved melt elasticity, that is higher tan delta as measured by DMS, better drawability, that is higher melt strength as measured by melt tension, less swelling as measured by blow molding die swell, and less shrinkage as measured by mold shrinkage than the unmodified polymer and the broad MWD (greater than 3.0 Mw/Mn). counterpart in thermoforming and large part blow molding.

There are many types of molding operations which can be used to form useful fabricated articles or parts from the formulations disclosed herein, including various injection molding processes (e.g., that described in *Modern Plastics Encvclopedia*/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encvclopedia*/89, Mid October 1988 Issue, Volume 65, Number 11, pp. 217–218, "Extrusion-Blow Molding", the disclosure of which is incorporated herein by reference), profile extrusion, calendering, pultrusion and the like.

The rheology-modified ethylene polymers, processes for making them, and intermediates for making them of this invention are useful in the automotive area, industrial goods, building and construction, electrical (e.g., wire and cable coatings/insulation) and tire products. Some of the fabricated articles include automotive hoses, single ply roofing, and wire and cable voltage insulation and jackets.

Film and film structures particularly benefit from this invention and can be made using conventional hot blown film fabrication techniques or other biaxial orientation processes such as tenter frames or double bubble processes. Conventional hot blown film processes are described, for example, in *The Encyclopedia of Chemical Technology,* Kirk-Othmer, Third Edition, John Wiley & Sons, New York, 1981, vol. 16, pp. 416–417 and Vol. 18, pp. 191–192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compostions described herein. The film structures can also be made as described in a tenter-frame technique, such as that used for oriented polypropylene.

Other multi-layer film manufacturing techniques for food packaging applications are described in *Packaging Foods With Plastics,* by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by the TAPPI Press (1992)).

The films may be monolayer or multilayer films. The film made using this invention can also be coextruded with the other layer(s) or the film can be laminated onto another layer(s) in a secondary operation, such as that described in *Packaging Foods With Plastics,* by Wilmer A. Jenkins and James P. Harrington (1991) or that described in "Coextrusion For Barrier Packaging" by W. J. Schrenk and C. R. Finch, *Society of Plastics Engineers RETEC Proceedings,* Jun. 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total milltilayer film structure. Other layers of the multilayer structure include but are not limited to barrier layers, and/or tie layers, and/or structural layers. Various materials can be used for these layers, with some of them being used as more than one layer in the same film structure Some of these materials include: foil, nylon, ethylene/vinyl alcohol (EVOH) copolymers, polyvinylidene chloride (PVDC), polyethylene terethphalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to 7 layers.

Such articles comprising the rheology-modified polymer of this invention may be made by melt processing the rheology-modified polymer according to this invention. That process may include processing pellets or granules of polymer which have been rheology-modified according to this invention. In a preferred embodiment, the pellets or granules are substantially free of unreacted crosslinking agent when the crosslinking agent comprises a heat-activated crosslinking agent.

Such articles may also be made by melt processing an intermediate comprising a homogeneous polymer which is not substantially free of unreacted crosslinking agent. Such intermediates are preferably treated with a crosslinking agent, but are not subjected to subsequent melt processing until the polymer is melted to make the article. The crosslinking agent may be either radiation or a heat-activated crosslinking agent.

The rheology-modified polymers and intermediates used to make rheology-modified polymers may be used alone or in combination with one or more additional polymers in a polymer blend. When additional polymers are present, they may be selected from any of the modified or unmodified homogeneous polymers described above for this invention and/or any modified or unmodified heterogeneous polymers.

The heterogeneous polyethylenes that may be combined with the rheology-modified polymers according to this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their methods of preparation. Heterogeneous linear ethylene polymers are available from The Dow Chemical Company as Dowlex™ LLDPE and as Attane™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. 4,950,541 and the patents to which it refers, all of which are incorporated herein by reference.

Compositions of the invention and compositions produced by practice of the invention are particularly useful because of their surprising properties. For instance the preferred medium density polyethylenes and ethylene copolymers (density about 0.90 g/mL, comonomer content 0.5–5 mole percent) of the invention are particularly useful as blown films such as in trash bags, grocery sacks, sealant layers, tie layers, produce bags, garment bags, shipping sacks, medical films, stretch film, shrink film; agricultural film, construction film, geomembranes, stretch hooders, and the like, preferably trash bags, agricultural film, construction film, and geomembranes. Similarly the medium density preferred embodiments are useful in cast films such as are useful in stretch films, diaper backsheets, industrial wrap, produce wrap, meat wrap, consumer wrap, shrink film elastic film and the like, preferably as elastic film. The high density polyethylene (density greater than about 0.945 g/mL and preferably MWD less than about 3) preferred embodiments are particularly useful for thermoforming, preferably for use in refrigerator liners, thin walled containers, medical blister packs, modified atmosphere packaging; and in blow molding to form such articles as oil bottles, pipe, fuel tanks, milk jugs, and trigger bottles. The low density ethylene copolymer preferred embodiments (density less than about 0.89 g/mL and comonomer content preferably about 5–25 mole percent) are particularly useful in extrusion such as to form wire and cable coatings, tubing, profiles such as gaskets and seals, sheeting, extrusion coatings such as carpet backing, multilayer packaging, tougheners, and impact modifiers for blends of polymers, preferably for wire and cable coating, tougheners and impact modifiers. The low density preferred embodiments are also particularly useful for calendaring to form such materials as sheeting, packaging films, and non-packaging films; for foams particularly cushion packaging, toys, building and construction uses, automotive uses, body boards, airline seats, floral and craft uses, preferably cushion packaging, building and construction, automotive uses, and body boards; and for adhesives and sealants, particularly hot melt adhesives, pressure sensitive adhesives (whether applied in solvents or by hot melt), caulks, and as tackifiers in other compositions.

Practice of the present invention increases the utility of ethylene polymers, particularly high density polyethylene, and propylene polymers in the automotive field. With increased melt strength it becomes possible to produce such automotive articles as fascia, bumper energy absorbers, bumper beams, door trim panels, door hardware cartridges, seat backs, seat pans, head rest cores, header trim, header energy absorbing (EA) inserts, pillars, instrument panels, instrument panel trim, bolsters, glove boxes, doors, consoles, ducts, parcel shelves, hat shelves, load floors, rocker panels, fenders and the like and combinations thereof using such means as blow molding, injection molding, thermoforming, and gas assisted injection molding. Furthermore, such automotive articles as cross car supports, door outer panels, seat trim, and the like and combinations thereof can be produced using such means as blow molding, injection molding, and thermoforming. Such articles as roof liners, underbody closeouts (underbody shields), pick-up bed liners, and wheel liners can be conveniently produced by thermoforming; while such articles as fuel filler necks and fuel tanks can be produced using blow molding, rotomolding or injection molding. Injection molding, thermoforming and gas assisted injection molding are useful for producing door impact beams. Such articles as bumper beams, door impact beams, heater trim, roof liners, ducts, pick-up bed liners, fuel filler necks, fuel transport lines and conductive fuel systems are conveniently produced by extrusion or coextrusion as well. Coextrusion is additionally useful for rocker panels and fenders. Conductive fuel systems are also optionally roto-molded or blow molded. Rotomolding is also useful for door EA inserts, seat backs, head rest cores, header EA, instrument panel trim, bolsters, and ducts; while blow molding is additionally useful for door EA inserts. Furthermore, foaming is useful for bumper energy absorbers, bumper beams, door trim panels, door EA inserts, seat trim, head rest cores, header trim, roof liners, header EA, pillars, instrument panel trim, bolsters, and pick-up bed liners. Compression thermoforming, that is thermoforming at a pressure greater than about 240 kPa, is useful to produce such articles as bumper beams, cross car supports, door impact beams, door outer panels, door hardware cartridges, seat backs, seat pans, header trim, roof liners, instrument panel trim, bolsters, ducts, parcel shelves, hat shelves, load floors, rocker panels, fenders, underbody closeouts, pick-up bed liners, wheel liners and the like and combinations thereof. Practice of the invention advantageously facilitates blow molding, thermoforming and foaming ethylene polymers and propylene polymers that without reaction with poly(sulfonyl azide) would not be conveniently shaped using those methods and which have a fractional melt (as measured by the procedure of ASTM-D1238 using 5 kg weight and 109° C.) at least one order of magnitude lower than starting material before coupling.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

Test Methods

A Rheometrics, Inc. RMS-800 dynamic mechanical spectrometer with 25 mm diameter parallel plates was used to determine the dynamic Theological data. A frequency sweep with five logarithmically spaced points per decade was run from 0.1 to 100 rad/s at 190° C. The strain was determined to be within the linear viscoelastic regime by performing a strain sweep at 0.1 rad/s and 190° C., by strain sweep from 2 to 30 percent strain in 2 percent steps to determine the minimum required strain to produce torques within the specification of the transducer; another strain sweep at 100 rad/s and 190° C. was used to determine the maximum strain before nonlinearity occurred according to the procedure disclosed by J. M. Dealy and K. F. Wissbrun, "Melt Rheology and Its Role in Plastics Processing", Van Nostrand, N.Y. (1990). All testing was performed in a nitrogen purge to minimize oxidative degradation.

A Perkin Elmer model TMA 7 thermomechanical analyzer was used to measure the upper service temperature. Probe force of 102 g and heating rate of 5° C./min were used. Each test specimen was a disk with thickness of about 2 mm and diameter, prepared by compression molding at 205° C. and air-cooling to room temperature.

Xylene Extraction to determine gel content was performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent extracted=(initial weight-final weight)/initial weight according to ASTM D-2765 Procedure "A"

Samples were prepared using either a HaakeBuchler Rheomix 600 mixer with roller style blades, attached to a HaakeBuchler Rheocord 9000 Torque rheometer, or using a Brabender mixer (Type R.E.E. No. A-19/S.B) with a 50 g mixing bowl All instruments were used according to manufacturer's directions.

EXAMPLES 1 AND 2

And Comparative Sample A: Films

The resin used in Examples 1 and 2 is an ethylene-octene copolymer with Mw/Mn=3.26, Mw=71100, having a melt index of 6 (g/10 min.), and a density of 0.919 g/cc commercially available from The Dow Chemical Company under the trade designation DOWLEX 2035 polyethylene referred to hereinafter by the trade designation.

Resin Preparation for Examples 1 and 2

One hundred pounds (45.4 kg) of the DOWLEX™ 2035 polyethylene resin pellets (containing 200 ppm hindered polyphenolic stabilizer commercially available from Ciba Geigy Corporation under the trade designation Irganox 1010 stabilizer and 750 ppm synthetic dihydrotalcite commercially available from Kyowa under the trade designation DHT 4A stabilizer) were tumble blended with 200 ml of mineral oil for 30 minutes in a 55 gallon (207.9 liter) fiber drum (with liner) at about 6 rotations per minute. A total of 54.4 g (corresponding to 1200 ppm) of 4,4'-oxybis (benzenesulfonyl azide)(hereinafter BSA) was added to the above mixture and tumble blended for 2 hours to ensure adequate coating of the pellets. The above procedure was repeated three times such that 300 pounds (136.2 kg) of coated resin were produced. After the dry blending, this admixture of coupling agent and resin was fed into a twin screw extruder having a screw diameter of 30 cm commercially available from Werner Pfleiderer Corporation under the trade designation ZSK-30 twin screw extruder. The extruder measured temperature was 130° C., 175° C., 215° C., 221° C., and 221° C. for zones 1, 2, 3, 4, and 5, respectively. The temperature was measured using thermocouples that contact the metal. The distances of the thermocouples from the center of the feed zone are about 8.8, 38.8, 56.2, 66.3, 78.8, and 88.8 cm from the feed to the discharge (die) of the extruder for Zones 1, 2, 3, 4, and 5, respectively. The melt temperature and die temperatures were 230° C. and 220° C., respectively. The melt-extruded resin ran through a water cooling bath (at 19° C.) before it was pelletized. The output rate for this process was 30 pounds/hr (13.6 kg/hr). A total of 300 pounds (136.2 kg)of the coupled resin was collected for further study. The final resin (after treatment) had a measured 1.0 g/10 min melt index and 0.919 g/cc density.

Film Fabrication

Films were fabricated in a blown film extruder having a 2.5 inch (6.25 cm) single screw commercially available from Battenfeld Glouscescer Engineering Inc. under the trade designation Model 22-01 using the detailed fabrication parameters as follows:

| | |
|---|---|
| Die gap: | 70 mil (1.75 mm) |
| Die type: | Sano |
| Die diameter: | 6 inches (15.2 cm) |
| Screw type: | Barr ET |
| Output rate: | 188 lb/h (85.1 kg/hr) |
| | (10 lb/hr/in die) |
| | (4.53 kg/hr/m die) |
| Melt Temp: | ~400° F. (204° C.) |
| Temperature profile: | 350° F., 425° F., 290° F., 290° F. |
| | (177° C., 218° C., 143° C., 143° C.) |
| Cooling Air: | yes |
| Blow up ratio: | 2.0 & 2.9 |
| Film gauge: | 6.0 mil (0.15 mm) |
| Shear at the die: | ~106/s (metric unit) |

3000 ppm of $SiO_2$ was added as an antiblock to all of the resins, and 1000 ppm of polymer processing aid commercially available from 3M Co. under the trade designation Dynamar-5920 was added to all the resins. The $SiO_2$ and Dynamar-5920 processing aid were dry-blended with the pellets; the additive blended pellets were then fed to the extruder to prepare the film.

Puncture at room temperature was measured using an instrument for the purposed commercially available from Instron Inc. under the trade designation Instron Model 4201 with a hardware upgrade commercially available from Sintech Inc. and a testing frame commercially available from Sintech Inc. under the trade designation MTS Sintech ReNew testing frame along with software commercially available from Sintech Inc. under the trade designation Sintech (Version 3.08) Testing Software. Four samples of each film with dimensions of 6"×6" (15×15 cm) were measured using a round specimen holder 12.56" (31.9 cm) square. A puncture probe is a ½" (1.27 cm) polished stainless steel ball with 7.5" (18.75 cm) maximum travel and travel speed of 10 inches/min (25.4 cm/min). The energy required to break the film was measured.

Elmendorf Tear Strength is measured at 23° C. according to the procedures of ASTM D1922. MD (Machine Direction) Ult (ultimate) Tensile Strength and CD (Cross Direction) Ult Tensile Strength are measured according to the procedures of ASTM D638.

Results of these measurements are shown in Table 1:

TABLE 1

Mechanical Properties of Film

| Properties of Film | Ex 1 100% DOWLEX ™ 2035 polyethylene 1250 ppm BSA (2.0)* | Std Dev | Ex. 2 100% DOWLEX ™ 2035 polyethylene 1250 ppm BSA (2.9)* | Std Dev |
|---|---|---|---|---|
| Extruder Pressure (psi) | 1720 | | 1720 | |
| Elmendorf Tear Strength (23° C.) (ASTM D1922) | | | | |
| MD Tear Strength (g) | 1104.00 | 147.00 | 1384.30 | 85.80 |
| CD Tear Strength (g) | 2060.80 | 94.90 | 1900.80 | 86.50 |
| Puncture at Room Temp. Energy to Break (in-lb) | 35 | 2 | 44 | 4 |
| MD Ult Tensile Strength (psi) ASTM D638 | 3530 | 524 | 3410 | 670 |
| MD Elongation at Break (%) | 740 | 73 | 740 | 97 |
| MD Tensile Yield (psi) | 1480 | 26 | 1480 | 32 |
| CD Ult Tensile Strength (psi) ASTM D638 | 3480 | 345 | 3540 | 496 |
| CD Elongation at Break (%) | 760 | 52 | 750 | 68 |
| CD Tensile Yield (psi) | 1610 | 9 | 1540 | 18 |
| Haze (%) (ASTM D1003) | 27.2 | 0.1 | 22.0 | 0.3 |

DOWLEX is a trademark of The Dow Chemical Company.
*Blow up Ratio in parenthesis
CD and MD are Cross Direction and Machine Direction orientation of the film.

TABLE 2

Metric conversions of measurements

| Properties of Film | Ex. 1 100% DOWLEX ™ 2035 polyethylene 1250 ppm BSA (2.0)* | metric conversion | Ex. 2 100% DOWLEX ™ 2035 polyethylene 1250 ppm BSA (2.9)* | metric conversion |
|---|---|---|---|---|
| Extruder Pressure (psi) Mpa | 1720 | 11.86 | 1720 | 11.86 |
| Elmendorf Tear Strength (23° C.) (ASTM D1922) | | | | |
| MD Tear Strength (g) | 1104.00 | same | 1384.30 | |
| CD Tear Strength (g) | 2060.80 | | 1900.80 | |
| Puncture at Room Temp. | | | | |
| Energy to Break (in-lb) (cm/kg) | 35 | 40.25 | 44 | 50.6 |
| MD Ult Tensile Strength (psi) ASTM D638 | 3530 | 24.33 | 3410 | 23.51 |
| MD Elongation at Break (%) | 740 | | 740 | |
| MD Tensile Yield (psi) Mpa | 1480 | 10.20 | 1480 | 10.20 |
| CD Ult Tensile Strength (psi) ASTM D638 | 3480 | 23.99 | 3540 | 24.4 |
| CD Elongation at Break (%) | 760 | | 750 | |
| CD Tensile Yield (psi) Mpa | 1610 | 11.10 | 1540 | 10.6 |
| Haze (%) (ASTM D1003) | 27.2 | | 22.0 | |

DOWLEX is a trademark of The Dow Chemical Company.
*Blow up Ratio

Comparative Samples A and B

Samples of 2.0 kg each of an ethylene-octene copolymer with Mw/Mn=3.26, Mw=71,100, having a melt index of 6.0 g/10 min., and a density of 0.919 g/cc commercially available from The Dow Chemical Company under the trade designation DOWLEX™ 2035 polyethylene resin (containing the same additives as in Example 1) for Comparative Sample A and a linear low density ethylene/octene copolymer with Mw/Mn=3.96, Mw=114,800 melt index= 1.0 g/10 minutes and density of 0.92 g/cm$^3$ commercially available from The Dow Chemical Company under the trade designation DOWLEX™ 2045A polyethylene resin having an additive package consisting of 1250 ppm of Calcium Stearate, 200 ppm of ant-oxidant commercially available from Ciba Geigy Corp. under the trade designation Irganox 1010, and 1600 ppm of phosphite antioxidant commercially available from Ciba Geigy Corp. under the trade designation Irgaphos 168, for Comparative Sample B were prepared according to the following procedure:

Each resin is imbibed with BSA of the concentration designated in Table 3 by the procedure:

1) The designated amount of the resin was weighed into a high density polyethylene bag.
2) An amount of a 5 weight percent solution of BSA in tetrahydrofuran (THF) corresponding to the designated amount of the azide was prepared.
3) The solution of BSA was dispensed over the resin in multiple portions from a syringe having an industrial blunt-tipped needle.
4) The bag was closed and the resin was vigorously mixed following the addition to ensure homogeneity.
5) The bag was opened in a fume hood and the THF was allowed to evaporate for a minimum of 2 hours to prepare dry pellets.
6) The coated dry pellets were mixed one final time and then put in the hopper of a feeder for metering to an extruder.

A total of 10.0 g of the BSA was deposited on each 2.0 kg sample, providing a 500 ppm (weight/weight) level of the BSA on each sample.

After Step 6 of the procedure, the coated pellets were fed into a twin screw extruder having a screw diameter of 18 mm commercially available from Haake, Inc. under the trade designation Haake Polylab Micro 18 twin screw extruder. The extruder has Zones 1–5 from the feed zone to the discharge die of the extruder; these zones are 3.5 inch long heated blocks, centered 4 inches, 7.5 inches, 11 inches, 14.5 inches, and 18 inches from the center of the feed throat for the extruder for Zones 1, 2, 3, 4, and 5 respectively. Temperatures set for each zone are 50° C., 75° C., 85° C., 90° C., and 93° C., respectively with measured temperatures of 53.8° C., 75° C., 84.9° C., 90° C., and 93.1° C. measured for Zones 1, 2, 3, 4, and 5, respectively. The temperature was measured using thermocouples that contact in the body of the extruder barrel. The die temperature was set to and measured at 93° C., with a melt temperature of 100° C. Die pressure was 1700 psi (11,721 kPa); feed rate was 1.0 lb/hr (0.45 kg/h); extruder screw speed was 50 rpm (revolutions per minute) with an extruder torques of 5700 meter grams. The extruded polymer is drawn through a water bath for cooling and the resulting polymer strands are cut into pellets.

The resulting polymers had significant black specks as noted by visual inspection of the pellets. The specks were actually incorporated into the each of the pellets. No film could be produced due to the amount of black specks.

EXAMPLE 3

Example 3 was prepared as though for a concentrate, or master batch. A 0.038 lb (0.017 kg) sample of BSA, 0.100 lb (0.045 kg) of mineral oil (commercially available from Witco Corp. under the trade designation Kaydol), and 24.863 lb (11.28 kg) of an ethylene-octene copolymer with Mw/Mn=3.39, Mw=94,300, having a melt index of 2.3 g/10 min., and a density of 0.917 g/cc commercially available from The Dow Chemical Company under the trade designation Dowlex™ 2047 polyethylene resin (containing 500 ppm polyphenolic antioxidant commercially available from Ciba Geigy Corporation under the trade designation Irganox 1076 and 1600 ppm phosphite stabilizer commercially available from Ciba Geigy Corporation under the trade designation Irgaphos 168) was tumble blended for 60 minutes in a poly bag lined fiber drum. A concentrate was formed in the mineral oil. The concentrate coated pellets were then extruded under the conditions described in Comparative Sample A, to provide an ethylene-octene copolymer with modified Theological properties.

EXAMPLES 4 AND 5
Preparation of Concentrate 1

A 10 weight percent concentration of BSA in an ethylene-octene copolymer with Mw/Mn=2.03, Mw=110,800, having a melt index of 5.00 g/10 min., and a density of 0.870 g/cc commercially available from The Dow Chemical Company under the trade designation AFFINITY™ EG8200 polyolefin plastomer (referred to hereinafter by the trade designation) for a master batch (Concentrate 1) was formed by mixing a sample of 27.2 g of BSA with 243 g of the AFFINITY™ EG 8200 polyolefin plastomer (containing 500 ppm of hindered phenolic stabilizer commercially available from Ciba Geigy Corporation under the trade designation Irganox 1076 and 800 ppm stabilizer believed to be tetrakis-(2,4-ditertiarybutyl-phenyl)-4,4'-biphenyl phosphonite commercially available from Sandoz Chemical Company under the trade designation P-EPQ stabilizer) and 2 g of mineral oil (commercially available from Penreco Corp. under the trade designation Drakeol 35). Pellets were put into a five gallon polyethylene bag, the BSA powder was added in the center, then the oil squirted from a syringe in a circle around the powder pile. The bag was then closed at the top, leaving an air space above the mixture and shaken until it appeared to be completely mixed, i.e., no loose powder was visible in the bag, for approximately two minutes. The resulting mixture was extruded on a twin screw extruder having a screw diameter of 18 mm commercially available from Haake, Inc. under the trade designation Haake Polylab Micro-18 twin screw co-rotating extruder at 50 rpm with the following temperature profile for each zone: Zone 1, 2, 3, 4, and 5 set at 70, 80, 90, 90, 90° C., respectively. The strand from the extruder was passed through a chilled water bath then chopped by a strand cutter commercially available from Berlyn under the trade designation Pell-2 strand cutter. The extruder screw was comprised of 9 elements with the following configuration (referring to the length of the screw stack element in mm, and the angle of pitch of the screw on the mixing element in degrees): 90 mm & 40°, 90 mm & 40°, 90 mm & 40°, 60 mm & 40°, 60 mm & 40°, 30 mm & 40°, 30 mm & 40°, 90 mm & 30°, screw tip.

Preparation of Concentrate 2

The procedure for preparation of Concentrate 1 was repeated to form Concentrate 2 except that 13.6 g of BSA were used to form a 5 weight percent concentration of BSA in the ethylene-octene copolymer commercially available from The Dow Chemical Company under the trade designation AFFINITY™ EG 8200 polyolefin plastomer referred to hereinafter by the trade designation and containing 500 ppm Irganox 1076 stabilizer and 800 ppm P-EPQ stabilizer for a master batch (designated Concentrate 2).

EXAMPLE 4

A 19.693 lb (8.93 kg) sample of an ethylene-octene copolymer with Mw/Mn=3.39, Mw=94,300, having a melt index of 2.3 g/10 min., and a density of 0.917 g/cc commercially available from The Dow Chemical Company under the trade designation DOWLEX™ 2047 polyethylene resin mixed with 0.307 lbs (0.139 kg) of Concentrate 1 was placed in a fiber drum which had an HDPE (high density polyethylene) bag liner and tumble blended for approximately 60 minutes (rotation about 10 RPM). The resulting mixture was fed into the twin screw extruder used in Example 1. The extruder actual temperatures are 130, 175, 215, 221, and 221° C. for Zones 1–5, respectively, from the feed to the discharge (die) of the extruder. The melt temperature and die temperatures were 230 and 220° C., respectively. The resulting melt-extruded resin ran through a water cooling bath (at 19° C.) before it is pelletized. The output rate for this process is 30 pounds/hr (13.6 kg/h), and 300 pounds (136.2 kg) of the coupled resin is collected for further study. The final resin (after treatment) has a measured 1.0 g/10 min melt index and 0.919 g/cc density.

EXAMPLE 5

For Example 5, the procedure of Example 4 is repeated except that Concentrate 2 is used in an amount of 0.65 lb (0.29 kg) with 24.35 lb (11.04 kg) of the resin.

Film Extrusion

Films were fabricated in a blown film extruder having a 1.25 inch (3.175 cm) single screw commercially available from Killion Extruders, Inc. under the trade designation Killion model KL125 using the detailed fabrication parameters as follows:

| | |
|---|---|
| Die gap: | 60 mil (1.52 mm) |
| Die type: | Sano |
| Die diameter: | 3 inches (0.076 m) |
| Screw type: | single |
| Output rate: | ~10 lb/h (4.5 kg/h) |
| Melt Temp: | ~450° F. |
| Temperature profile: | 350, 400, 450, 450° F. (177, 204, 232, 232° C.) respectively) |
| Cooling Air: | no |
| Blow up ratio: | 1.8 |
| Film gauge: | 3.0 mil (0.076 mm) |
| Shear at the die: | 18 1/sec |

Viscosities are determined as described previously, I10 and I2 are determined by the procedure of ASTM D 1238 and the results of these analyses are recorded in Table 3.

TABLE 3

Rheology of Coupled LLDPE (linear low density polyethylene) Using Concentrates of BSA

| Properties | Ex. 3 | Ex. 4 | Ex. 5 |
|---|---|---|---|
| Concentrate vehicle | Mineral Oil | (master batch) AFFINITY ™ EG8200 polyolefin plastomers | (Master Batch) AFFINITY ™ EG8200 polyolefin plastomers |
| concentration of BSA in vehicle (concentrate) | 27.5 weight percent | 10 weight percent | 5 weight percent |
| concentration of BSA in polymer | 1500 ppm BSA | 1360 ppm BSA | 1300 ppm BSA |
| Base Resin | Dowlex ™ 2047 polyethylene | Dowlex ™ 2047 polyethylene | Dowlex ™ 2047 polyethylene |
| I2 | 0.18 | 0.42 | 0.45 |
| I10/I2 | 21.9 | 14.5 | 15.6 |

TABLE 3-continued

Rheology of Coupled LLDPE (linear low density polyethylene) Using Concentrates of BSA

| Properties | Ex. 3 | Ex. 4 | Ex. 5 |
|---|---|---|---|
| 0.1 Vis (Pa-s) | 5.0 E4 | 3.0 E4 | 5.0 E4 |
| 0.1/10 Vis. | 33 | 20 | 33 |
| Back Press. | 17236 +/− 2068 | 14479 +/− 2068 | 15168 +/− 2068 |

Back press means back pressure and is the pressure of the polymer melt inside the extrusion head measured by a pressure transducer on the extrusion equipment in units of kPa The results in Table 6 indicate that the BSA is very effective when added using a concentrate (Ex 3, 4 and 5). The improvement in rheology is measured by the increase in I10/I2 or 0.1/100 viscosity.

EXAMPLES 6 AND 7
And Comparative Sample C

The resin used for Examples 6 and 7, and Comparative Sample C is an ethylene-propylene-ethylidene norbornene terpolymer with Mw/Mn=3.73, Mw=136,200, having a melt index (I2) of 1.0 g/10 min., and a density of 0.88 g/cc commercially available from DuPont Dow Elastomers under the trade designation Nordel IP NDR 3720P hydrocarbon rubber (containing 1000 ppm Irganox 1076 stabilizer).

For Example 6, a concentrate is made on a twin screw extruder with am 18 mm barrel, commercially available from Haake, Inc. under the trade designation Haake Polylab Micro 18 by dry blending 34.05 g of the BSA and 5.0 lb (2.27 kg) of an ethylene-octene copolymer with Mw/Mn= 1.90, Mw=19,000, having a melt index of 1000 g/10 min., and a density of 0.87 g/cc commercially available from The Dow Chemical Company under the trade designation XUS-59800.02 polyolefin elastomer.

This dry blend is extruded at a low temperature of 110° C. to avoid reacting the carrier wax with the BSA. The resulting melt blended concentrate is water quenched by drawing through a water bath at 18° C. and chopped into pellets. A total of 10 kg of an ethylene-propylene-ethylidene norbornene terpolymer with Mw/Mn=3.73, Mw=136,200, having a melt index of 1.0 g/10 min., and a density of 0.88 g/cc commercially available from DuPont Dow Elastomers under the trade designation Nordel IP NDR 3720P hydrocarbon rubber, pellets and 240 g of the concentrate are dry blended and then extruded as described below.

For Example 7, an oil coated blend is made by adding 25 g of a mineral oil commercially available from Witco Corp. under the trade designation Kaydol to 10 kg of pellets of Nordel IP NDR 3720P hydrocarbon rubber and then tumble blended for a period of 1 hour at ambient temperature to coat the pellets with the oil. Then 12.5 g of BSA is added to the oil coated pellets and again tumbled blended by hand for a period of 5 minutes at a temperature of 25° C. to mix the BSA into the coating of oil to form a concentrate of BSA in the oil. The resulting blend is also extruded as described below.

For Comparative Sample C, an untreated sample of 5 lb. (2.27 kg) of the Nordel IP NDR 3720P hydrocarbon rubber is extruded without BSA to expose it to the same conditions as Example 2 and is referred to herein as Comparative Sample C.

The Examples 6 and 7 and Comparative Sample C are melt blended at the conditions below on the twin screw extruder used in Example 1.

The following extrusion conditions are used:
Zone 1 Temp Set 80° C.
Zone 2 Temp Set 130° C.
Zone 3 Temp set 190° C.
Zone 4 Temp set 190° C.
Zone 5 Temp set 190° C.
Die Temp set 190° C.
Extruder RPM's set to 250
Water Bath 57° F. (13.9° C.)
Output Rate 17–23 lb/hr (7.7–10.4 kg/h)

Properties of the resulting polymers are measured as described for Example 1.: Mooney viscosity is determined according to the procedure or ASTM 1646–92 (at 25° C., 9 minutes run time, using a 38.1 mm diameter rotor at a rotor speed of 0.02 rad/sec).

TABLE 4

Properties of Rheology Modified EPDM (ethylene propylene diene monomer rubber) with BSA

| Example or Comparative Sample | Azide | Mooney viscosity | Gels (percent) |
|---|---|---|---|
| C.S. C | 0 | 18.2 | 0.967 |
| Ex. 6 | 1250 ppm 1000 m.i. Conc. | 24.3 | 0.827 |
| Ex. 7 | 1250 ppm Oil coated | 25.3 | 0.935 |

TABLE 5

Rheology of EPDM (ethylene propylene diene monomer rubber) Modified with BSA

| | Visc 0.1 | Visc 100 | Visc 0.1/100 | Tan 0.1 | % Visc. Change @ 0.1 | % Visc. Change @ 100 | % Tan Change |
|---|---|---|---|---|---|---|---|
| Base Polymer Nordel IP NDR 3720P hydrocarbon rubber | 241810 | 13516 | 17.89 | 2.0618 | | | |
| Ex. 6 | 822420 | 15331 | 53.64 | 0.781 | 240 | 13 | −62 | vis. is viscosity

Preparation of Rheology Modified HDPE in a Twin Screw Extruder

As Example 8, a sample of an ethylene-butene copolymer with a melt index (I5) of 0.43 g/10 min., an I 21.6/I5 of 24.2g/10 min., and an I10/I2 of 19.2 (as measured on an instrument commercially available from Custom Scientific Instruments, Inc. under the trade designation MicroMelt Indexer Model #CS127, run at 190° C. with 2.16 Kg weight for I2 according to ASTM 1238 but with 1/6 sample size), and a density of 0.955 g/cc commercially available from The Dow Chemical Company under the trade designation HDPE 40055E polyethylene (hereinafter the HDPE) having properties of melt strength and melt index listed hereinafter and containing 335 ppm of a hindered polyphenolic stabilizer commercially available from Ciba Geigy Corporation under the trade designation Irganox 1010 stabilizer and 1005 ppm of phosphite stabilizer commercially available from Ciba Geigy Corporation under the trade designation Irgaphos 168 stabilizer; and as Example 9 a sample of an ethylene-butene copolymer with a melt index (I5) of 0.23 g/10 min., an I10/I2 of 22.4 according to the test method used for Example 8, and a density of 0.935 g/cc commercially available from BASF Corp. under the trade designation Lupolen 4261A (properties of melt strength and melt index listed hereinafter), are rheology modified with BSA at levels of 400 ppm and 200 ppm BSA respectively. The BSA is added to the HDPE as a concentrate of 1 weight percent BSA in poly(ethylene-co-acrylic acid) commercially available from The Dow Chemical Company under the trade designation PRIMACOR 3150 adhesive copolymer, (hereinafter EAA) having 3 percent acrylic acid. The 1 percent concentrate is prepared from a "superconcentrate" of 10 weight percent BSA in the same EAA. The superconcentrate is prepared by adding 20 g BSA to 180 g EAA and mixing in a mixer commercially available from Haake, Inc. under the trade designation Rheocorder at 120° C. at 20–40 RPM for 10 minutes.

A 1 weight percent BSA concentrate is then prepared by mixing the superconcentrate with additional EAA on an extruder commercially available from Haake, Inc. under the trade designation Haake Polylab Micro-18 18 mm Leistritz twin screw extruder. The extruder screws were comprised of 7 elements with the following configuration (referring to the length of the screw stack element in mm, and the angle of pitch of the screw on the mixing element in degrees): 90 mm 40°, 90 mm 40°, 90 mm 40°, 60 mm 40°, 60 mm 40°, 90 mm 30°, 60 mm 30°. The tips are all forwarding elements.

Extrusion Profile for Concentrate Preparation

| | |
|---|---|
| Zone 1 | 75° C. |
| Zone 2 | 100° C. |
| Zone 3 | 115° C. |
| Zone 4 | 120° C. |
| Zone 5 | 120° C. |
| Die | 120° C. |
| Melt | 127° C. |
| Torque | 2500 mg (meter-grams) |
| RPM | 80 |
| Press | ~1000 PSI (6895 kPa) |
| Rate | 34–36 g/min |

EXAMPLE 8

Using a High Density Polyethylene

For Example 8 the HDPE described previously is prepared by tumble blending 73 lb (33 kg) of 2.74 lb (1.24 kg) of 1 weight percent BSA concentrate with 70.26 lb (31.9 kg) of the HDPE. The tumble blended material is fed to the twin screw extruder described in Example 1 under the conditions outlined in Example 9, extruded, cooled in a water bath and strand chopped into pellets.

EXAMPLE 9

Using an Ethylene-butene Copolymer

Example 9 is prepared by tumble blending 75 lb (34 kg) of 1.5 lb (0.7 kg) of 1 weight percent BSA concentrate with 73.5 lb (33.3 kg) of Lupolen 4261A polymer. The tumble blended material is fed to the twin screw extruder used in Example 8 under the conditions outlined below, extruded, cooled in a water bath and strand chopped into pellets.

Extruder Conditions for Examples 8 and 9

| | |
|---|---|
| Zone 1 | 75° C. |
| Zone 2 | 134° C. |
| Zone 3 | 191° C. |
| Zone 4 | 226° C. |
| Zone 5 | 225° C. |
| Die | 230° C. |
| Melt | 241° C. |
| Torque | 76 percent |
| RPM | 200 |
| Press | 925 PSI (6377 kPa) (Example 9) |
| | 750–760 PSI (5171–5240 kPa) (Example 8) |
| Rate | 31–32 lb/hr (14–14.5 kg/hr) (Example 9) |
| | 33.7–36.3 lb/hr (15.3–16.5 kg/hr) (Example 8) |

Melt Strength of Modified Materials:

| Sample | Velocity (mm/sec) | Melt Strength (cN) |
|---|---|---|
| Lupolen polymer | 120 | 32 |
| Lupolen polymer + 200 ppm | 24 | 80 |
| 40055E polyethylene | 55 | 19 |
| 40055E polyethylene + 400 ppm | 36 | 36 |

The data obtained by analysis of the products of Examples 8 and 9 shows an increase in melt strength after low levels of treatment with coupling agent.

What is claimed is:

1. A process of reacting a coupling agent comprising a poly(sulfonyl azide) with a polymer to form a rheology modified polymer, the process comprising the steps;
    (a) forming a first admixture, hereinafter referred to as a concentrate, of a poly(sulfonyl azide), a first amount of a first polymer or a liquid which does not require removal from the polymer, hereinafter diluent;
    (b) then forming a second admixture of the first admixture with a second amount of at least one second polymer, hereinafter second polymer composition, wherein the second polymer is a polyolefin; and
    (c) heating the second admixture at least to the decomposition temperature of the coupling agent for a time sufficient to result in coupling of polymer chains,
    wherein the rheology modified polymer has less than about 10 percent gel as measured by ASTM D2765-procedure A.

2. The process of claim 1 wherein the diluent is mineral oil.

3. The process of claim 1 wherein the first admixture further comprises at least one stabilizer.

4. The process of claim 3 wherein the stabilizer is at least one of a hindered polyphenolic stabilizer or a synthetic dihydrotalcite.

5. The process of claim 1 wherein step (b) takes place in an extruder.

6. The process of claim 1 wherein the polyolefin is a substantially linear ethylene polymer.

7. The process of claim 1 wherein the polyolefin is a polypropylene.

* * * * *